(12) United States Patent
Wang et al.

(10) Patent No.: US 11,829,318 B2
(45) Date of Patent: Nov. 28, 2023

(54) HANDSHAKE PROTOCOL CIRCUIT, CHIP AND COMPUTER DEVICE

(71) Applicant: INSPUR SUZHOU INTELLIGENT TECHNOLOGY CO., LTD., Jiangsu (CN)

(72) Inventors: Hongliang Wang, Jiangsu (CN); Qi Mou, Jiangsu (CN); Fancheng Meng, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 7 days.

(21) Appl. No.: 18/013,763

(22) PCT Filed: Feb. 25, 2021

(86) PCT No.: PCT/CN2021/077806
§ 371 (c)(1),
(2) Date: Dec. 29, 2022

(87) PCT Pub. No.: WO2022/012053
PCT Pub. Date: Jan. 20, 2022

(65) Prior Publication Data
US 2023/0176997 A1    Jun. 8, 2023

(30) Foreign Application Priority Data
Jul. 17, 2020  (CN) .......................... 202010692307.8

(51) Int. Cl.
*G06F 13/42* (2006.01)
(52) U.S. Cl.
CPC ................................ *G06F 13/4286* (2013.01)
(58) Field of Classification Search
CPC .................................................. G06F 13/4286
See application file for complete search history.

(56) References Cited

U.S. PATENT DOCUMENTS

| 2010/0235555 A1* | 9/2010 | Nguyen | G06F 13/4027 |
| | | | 710/110 |
| 2014/0244869 A1* | 8/2014 | Adrian | G06F 13/4022 |
| | | | 710/106 |

(Continued)

FOREIGN PATENT DOCUMENTS

| CN | 102193887 A | 9/2011 |
| CN | 105306022 A | 2/2016 |

(Continued)

OTHER PUBLICATIONS

International search report for PCT/CN2021/077806 dated Jun. 2, 2021.

(Continued)

*Primary Examiner* — Glenn A. Auve
(74) *Attorney, Agent, or Firm* — Dennemeyer & Associates LLC (57) ABSTRACT

A handshake protocol circuit, a chip and a computer device. In the present handshake protocol circuit, according to level signals of a first protocol signal input end, a first protocol signal output end, a second protocol signal input end and a second protocol signal output end, a control circuit controls a data storage circuit to store and output operation data, which is equivalent to caching the operation data by the storage circuit. Therefore, when the number of functional module circuits is relatively large, the continuity of combination logic of handshake protocols between the module circuits is relatively reduced, thereby relatively ensuring the normal communication of data between the functional module circuits. In addition, the present disclosure further provides a handshake protocol chip and a computer device.

20 Claims, 3 Drawing Sheets

(56) References Cited

U.S. PATENT DOCUMENTS

2015/0116001 A1* 4/2015 Rahman ............ H01L 23/5384
326/39
2018/0166889 A1 6/2018 Xu

FOREIGN PATENT DOCUMENTS

| | | | |
|---|---|---|---|
| CN | 106951379 A | 7/2017 | |
| CN | 107846052 A | 3/2018 | |
| CN | 108664436 A | 10/2018 | |
| CN | 112000603 A | 11/2020 | |
| EP | 3171245 B1 * | 3/2020 | ........... G06F 13/385 |

OTHER PUBLICATIONS

Office action for Chinese application No. 202010692307.8 filed on Jul. 17, 2020.

* cited by examiner

HANDSHAKE PROTOCOL CIRCUIT, CHIP AND COMPUTER DEVICE

CROSS-REFERENCE TO RELATED APPLICATION

The present application claims the priority of Chinese Patent Application CN202010692307.8, filed in the Chinese Patent Office on Jul. 17, 2020, and entitled "Handshake Protocol Circuit, Chip and Computer Device", the entire contents of which are herein incorporated by reference.

TECHNICAL FIELD

The present disclosure relates to the field of data communications, and in particular, to a handshake protocol circuit, a chip and a computer device.

BACKGROUND

In digital circuit design of data processing chips such as an IC (Integrated Circuit, integrated circuit) and an FPGA (Field Programmable Gate Array, field programmable gate array), in order to ensure effective transmission of data between various functional module circuits in the data processing chips, handshake protocols are often used between the functional module circuits to realize the effective transmission of data, so as to prevent the loss of the data.

Figure 1:
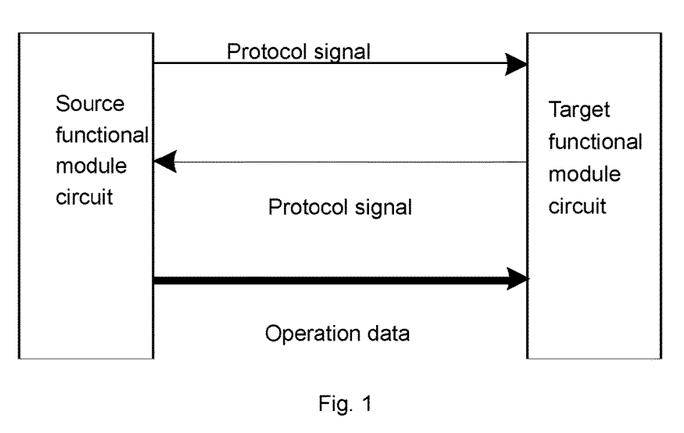
FIG. 1 is a schematic diagram of communication of handshake protocols between functional module circuits.

As shown in FIG. 1, it is a schematic diagram of communication of handshake protocols between functional module circuits. The main logic of the handshake protocol is that, when protocol signals transmitted bidirectionally between a source functional module circuit and a target functional module circuit are high and effective at the same time, the source functional module circuit transmits operation data to the target functional module circuit on a rising edge of a clock. In this case, when the number of functional module circuits is relatively large, excessive handshake protocols between the functional module circuits are cascaded during an operation data processing procedure, such that the combination logic of the handshake protocols between the functional module circuits is too large, so it is often difficult to meet the requirements of the clock frequency of the functional module circuits, and then it is difficult to ensure the normal communication of data between the functional module circuits.

SUMMARY

Embodiments of the disclosure provide a handshake protocol circuit, including:
a first protocol signal input end, configured to receive a first protocol signal transmitted by a first adjacent circuit;
a first protocol signal output end, configured to output the first protocol signal to a second adjacent circuit;
a second protocol signal output end, configured to output a second protocol signal to the first adjacent circuit;
a second protocol signal input end, configured to receive the second protocol signal transmitted by the second adjacent circuit;
a data input end, connected to a data storage circuit including a register, and configured to receive operation data transmitted by the first adjacent circuit;
a data output end, connected to the data storage circuit, and configured to output the operation data to the second adjacent circuit; and a control circuit, respectively connected to the first protocol signal input end, the first protocol signal output end, the second protocol signal input end, the second protocol signal output end and the data storage circuit, and configured to: according to a level signal of the first protocol signal input end, control the second protocol signal output end to output a level signal and control the data storage circuit to store the operation data transmitted by the data input end, and according to a level signal of the second protocol signal input end, control the first protocol signal output end to output a level signal and control the data storage circuit to output the operation data to the data output end.

In some embodiments, the control circuit includes:
a counter;
a first gating circuit, respectively connected to the first protocol signal input end, the second protocol signal output end, the counter and the data storage circuit, and configured to: when a count value of the counter is zero, output a high-level signal to the second protocol signal output end, and when the second protocol signal output end and the first protocol signal output end are both high-level signals, control the counter to increase the count value, and control the data storage circuit to store, in the register, the operation data transmitted by the data input end; and a second gating circuit, respectively connected to the first protocol signal output end, the second protocol signal input end, the counter and the data storage circuit, and configured to: when the count value of the counter is not zero, output a high-level signal to the first protocol signal output end, and when both the first protocol signal output end and the second protocol signal input end output high-level signals, control the counter to decrease the count value, and control the data storage circuit to output the operation data in the register to the data output end.

In some embodiments, the data storage circuit includes:
a register group including a plurality of registers;
a storage selection circuit, respectively connected to the data input end, the first gating circuit and the register group, and configured to: according to a control signal transmitted by the first gating circuit, store the operation data transmitted by the data input end in a corresponding register in the register group; and
an output selection circuit, respectively connected to the data output end, the second gating circuit and the register group, and configured to: according to a control signal transmitted by the second gating circuit, output the operation data of the corresponding register in the register group by the data output end.

In some embodiments, the number of registers in the register group is 2.

In some embodiments, the handshake protocol circuit further includes:
a write pointer register, respectively connected to the storage selection circuit and the first gating circuit, and configured to record a first register serial number transmitted by the first gating circuit, such that the storage selection circuit stores the operation data in a corresponding register in the register group according to the first register serial number; and
a read pointer register, respectively connected to the output selection circuit and the second gating circuit, and configured to record a second register serial number transmitted by the second gating circuit, such that the output selection circuit reads the operation data of the corresponding register in the register group according to the second register serial number.

In some embodiments, the first gating circuit includes:

a not-gate circuit, respectively connected to the second protocol signal output end and the counter; and a first and-gate circuit, respectively connected to the first protocol signal input end, the second protocol signal output end, the data storage circuit and the counter.

In some embodiments, the second gating circuit includes:

an or-gate circuit, respectively connected to the counter and the first protocol signal output end; and a second and-gate circuit, respectively connected to the counter, the data storage circuit, the first protocol signal output end and the second protocol signal input end.

In some embodiments, the counter is a count register.

In addition, the embodiments of the present disclosure further provide a chip, including the handshake protocol circuit as described above.

In addition, the embodiments of the present disclosure further provide a computer device, including the chip as described above.

DETAILED DESCRIPTION OF THE EMBODIMENTS

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those ordinary skilled in the art based on the embodiments of the present disclosure without any creative effort, fall into the protection scope of the present disclosure.

The main logic of a handshake protocol is that, when protocol signals transmitted bidirectionally between a source functional module circuit and a target functional module circuit is high and effective at the same time, the source functional module circuit transmits operation data to the target functional module circuit on a rising edge of a clock. In this case, when the number of functional module circuits is relatively large, excessive handshake protocols between the functional module circuits are cascaded during an operation data processing procedure, such that the combination logic of the handshake protocols between the functional module circuits is too large, so it is often difficult to meet the requirements of the clock frequency of the functional module circuits, and then it is difficult to ensure the normal communication of data between the functional module circuits.

To this end, the core of the present disclosure is to provide a handshake protocol circuit, so as to relatively ensure the normal communication of data between functional module circuits.

In order to enable those skilled in the art to better understand the solutions of the present disclosure, the present disclosure will be further described in detail below with reference to the drawings and specific embodiments.

Figure 2:
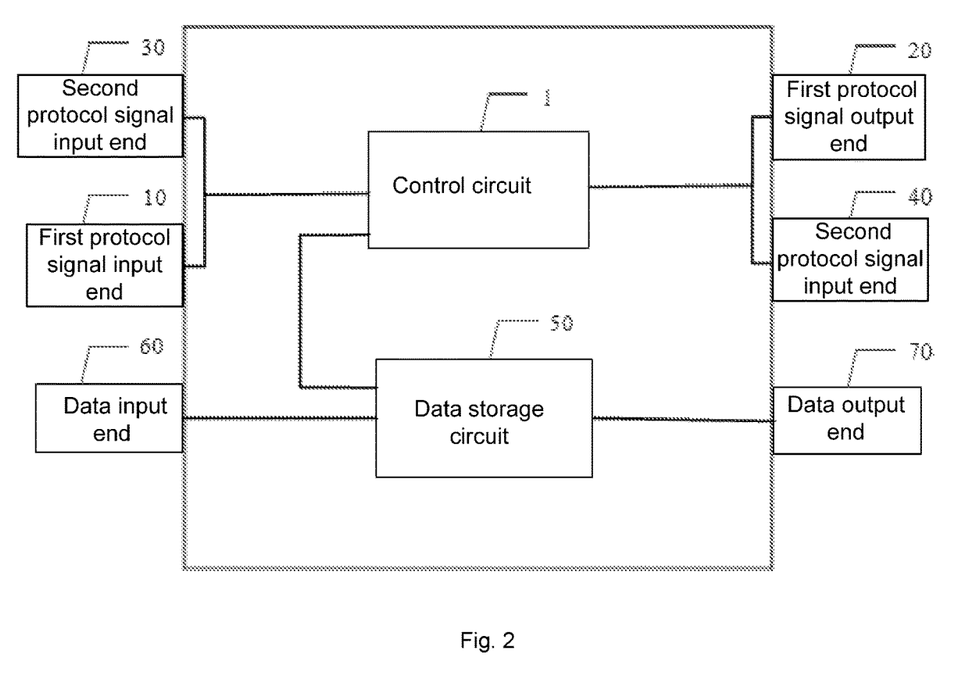
FIG. 2 is a schematic structural diagram of a handshake protocol circuit disclosed in an embodiment of this disclosure.

Please refer to FIG. 2, an embodiment of the present disclosure discloses a handshake protocol circuit, including:

a first protocol signal input end 10, configured to receive a first protocol signal transmitted by a first adjacent circuit;

a first protocol signal output end 20, configured to output the first protocol signal to a second adjacent circuit;

a second protocol signal output end 30, configured to output a second protocol signal to the first adjacent circuit;

a second protocol signal input end 40, configured to receive the second protocol signal transmitted by the second adjacent circuit;

a data input end 60, connected to a data storage circuit 50 including a register, and configured to receive operation data transmitted by the first adjacent circuit;

a data output end 70, connected to the data storage circuit 50, and configured to output the operation data to the second adjacent circuit; and a control circuit 1, respectively connected to the first protocol signal input end 10, the first protocol signal output end 20, the second protocol signal input end 40, the second protocol signal output end 30 and the data storage circuit 50, and configured to: according to a level signal of the first protocol signal input end, control the second protocol signal output end 30 to output a level signal and control the data storage circuit 50 to store the operation data transmitted by the data input end, and according to a level signal of the second protocol signal input end, control the first protocol signal output end 20 to output a level signal and control the data storage circuit 50 to output the operation data to the data output end.

The handshake protocol circuit provided in the present disclosure includes a first protocol signal input end, configured to receive a first protocol signal transmitted by a first adjacent circuit; a first protocol signal output end, configured to output the first protocol signal to a second adjacent circuit; a second protocol signal output end, configured to output a second protocol signal to the first adjacent circuit; a second protocol signal input end, configured to receive the second protocol signal transmitted by the second adjacent circuit; a data input end, connected to a data storage circuit including a register, and configured to receive operation data transmitted by the first adjacent circuit; a data output end, connected to the data storage circuit, and configured to output the operation data to the second adjacent circuit; and a control circuit, respectively connected to the first protocol signal input end, the first protocol signal output end, the second protocol signal input end, the second protocol signal output end and the data storage circuit, and configured to: according to a level signal of the first protocol signal input end, control the second protocol signal output end to output a level signal and control the data storage circuit to store the operation data transmitted by the data input end, and according to a level signal of the second protocol signal input end, control the first protocol signal output end to output a level signal and control the data storage circuit to output the operation data to the data output end. In the present handshake protocol circuit, according to the level signals of the first protocol signal input end, the first protocol signal output end, the second protocol signal input end and the second protocol signal output end, the control circuit controls the data storage circuit to store and output the operation data, which is equivalent to caching the operation data by the storage circuit. Therefore, when the number of functional module circuits is relatively large, the continuity of combination logic of handshake protocols between the module circuits is relatively reduced, thereby relatively ensuring the normal communication of data between the functional module circuits.

Figure 3:
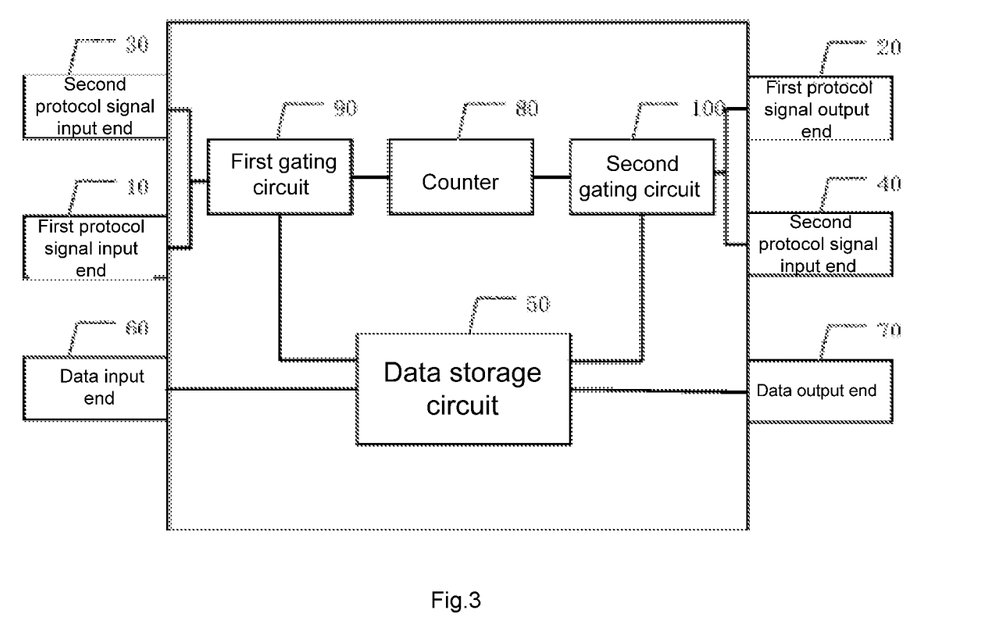
FIG. 3 is a schematic structural diagram of a handshake protocol circuit disclosed in an embodiment of this disclosure.

Please refer to FIG. 3, an embodiment of the present disclosure discloses a handshake protocol circuit, wherein the control circuit 1 includes:

a counter 80;

a first gating circuit 90, respectively connected to the first protocol signal input end 10, the second protocol signal output end 30, the counter 80 and the data storage circuit 50, and configured to: when a count value of the first counter 80 is zero, output a high-level signal to the second protocol signal output end 30, and when both the second protocol signal output end 30 and the first protocol signal output end 20 output high-level signals, control the counter 80 to increase the count value, and control the data storage circuit 50 to store, in the register, the operation data transmitted by the data input end 60; and a second gating circuit 100, respectively connected to the first protocol signal output end 20, the second protocol signal input end 40, the counter 80 and the data storage circuit 50, and configured to: when the count value of the counter 80 is not zero, output a high-level signal to the first protocol signal output end 20, and when the first protocol signal output end 20 and the second protocol signal input end 40 are both high-level signals, control the counter 80 to decrease the count value, and control the data storage circuit 50 to output the operation data in the register to the data output end 70.

It should be noted that, the handshake protocol circuit in the present embodiment may be used to implement data communication of the VALID/READY handshake protocol, and when the data communication of the VALID/READY handshake protocol is implemented by the handshake protocol circuit, the first protocol signal in the present embodiment specifically refers to a valid signal, and the second protocol signal specifically refers to a ready signal.

According to the handshake protocol circuit in the present embodiment, the counter is controlled by the first gating circuit and the second gating circuit to record the input and output of the first protocol signal and the second protocol signal, and the data storage circuit is controlled to store and output the operation data according to the numerical value in the counter, which is equivalent to caching the operation data by the storage circuit and the counter respectively, and caching the first protocol signal and the second protocol signal by the counter. Therefore, when the number of functional module circuits is relatively large, the continuity of combination logic of handshake protocols between the module circuits is relatively reduced, thereby relatively ensuring the normal communication of data between the functional module circuits.

Figure 4:
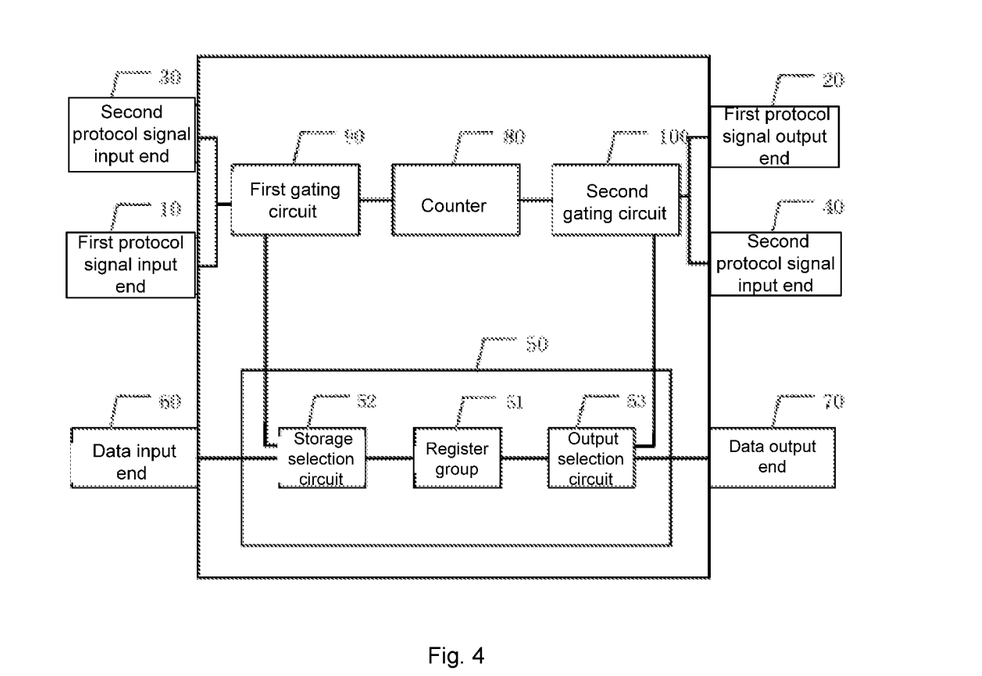
FIG. 4 is a schematic structural diagram of a handshake protocol circuit disclosed in an embodiment of this disclosure.

Please refer to FIG. 4, on the basis of the above embodiment, the data storage circuit 50 includes:

a register group 51 including a plurality of registers;

a storage selection circuit 52, respectively connected to the data input end 60, the first gating circuit 90 and the register group 51, and configured to: according to a control signal transmitted by the first gating circuit 90, store the operation data transmitted by the data input end 60 in a corresponding register in the register group 51; and an output selection circuit 53, respectively connected to the data output end 70, the second gating circuit 100 and the register group 51, and configured to: according to a control signal transmitted by the second gating circuit 100, output the operation data of the corresponding register in the register group 51 by the data output end 70.

It should be noted that, the key point in the present embodiment is that the data storage circuit 50 includes the register group 51, and the register group 51 includes a plurality of registers, and then the storage selection circuit 52, which is respectively connected to the data input end 60, the first gating circuit 90 and the register group 51, may store, according to the control signal transmitted by the first gating circuit 90, the operation data transmitted by the data input end 60 in the corresponding register in the register group 51; and the output selection circuit 53, which is respectively connected to the data output end 70, the second gating circuit 100 and the register group 51, may output, according to the control signal transmitted by the second gating circuit 100, the operation data of the corresponding register in the register group 51 by the data output end 70. In this way, the overall reliability during a transmission process of the operation data is further ensured.

On the basis of the above embodiment, as a preferred embodiment, the number of registers in the register group is 2.

It should be noted that, since the objective of the handshake protocol circuit is to cache the operation data transmitted by the source functional module circuit and to output the operation data in the cache to the target functional module circuit at a specific moment, so as to reduce the complexity of the combination logic of the handshake protocols between the functional module circuits, during a running process of the functional module circuits, the operation data is not stored in the register for a long term, the register may immediately cache newly transmitted operation data after outputting the existing operation data. Therefore, in the present embodiment, the number of registers in the register group is 2, and the board area of the handshake protocol circuit on a circuit board can be reduced while the overall reliability during the transmission process of the operation data is ensured.

On the basis of the above embodiment, further, the bit width of the counter is 2.

It should be noted that, in the present embodiment, the bit (bit) width in the counter is 2, that is, the counter may record numbers with the size of 2 bits, and the recordable binary numbers are respectively 00 (decimal number 0), 01 (decimal number 1), 10 (decimal number 2) and 11 (decimal number 3). Therefore, when the number of registers in the register group is 2, the number of operation data may be normally recorded, and the board area of the counter on the circuit board can be reduced while the overall reliability during the transmission process of the operation data is ensured.

On the basis of the above embodiment, as a preferred embodiment, the handshake protocol circuit further includes:

a write pointer register, respectively connected to the storage selection circuit 52 and the first gating circuit 90, and configured to record a first register serial number transmitted by the first gating circuit 90, such that the storage selection circuit 52 stores the operation data in a corresponding register in the register group 51 according to the first register serial number; and a read pointer register, respectively connected to the output selection circuit 53 and the second gating circuit 100, and configured to record a second register serial number transmitted by the second gating circuit 100, such that the output selection circuit 53 reads the operation data of the corresponding register in the register group according to the second register serial number.

It should be noted that, the key point in the present embodiment is to record, by the write pointer register that is respectively connected to the storage selection circuit and the first gating circuit, the first register serial number transmitted by the first gating circuit, such that the storage selection circuit can store the operation data in the corresponding register in the register group according to the first register serial number in the write pointer register. In addition, in the present embodiment, the read pointer register is further arranged between the output selection circuit and the second gating circuit, and the read pointer register records the second register serial number transmitted by the second gating circuit, such that the output selection circuit can output the operation data of the corresponding register in the register group according to the second register serial number. By means of the present embodiment, the accuracy of storing and reading the operation data by means of the register group is further ensured, thereby further ensuring the overall reliability during the transmission process of the operation data.

Figure 5:
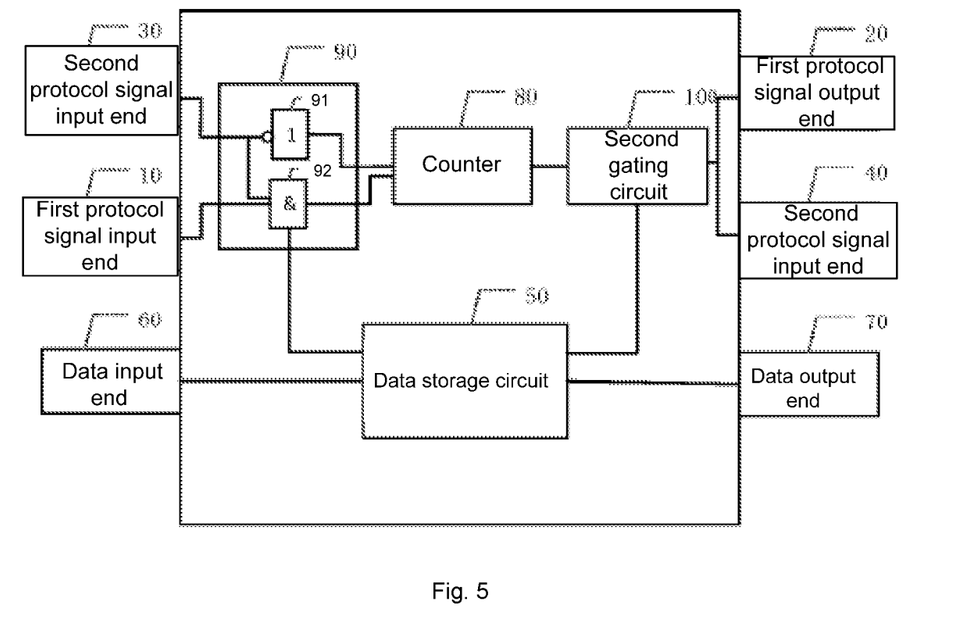
FIG. 5 is a schematic structural diagram of a handshake protocol circuit disclosed in an embodiment of this disclosure.

Please refer to FIG. 5, on the basis of the above embodiment, the first gating circuit 90 includes:

a not-gate circuit 91, respectively connected to the second protocol signal output end 30 and the counter 80; and a first and-gate circuit 92, respectively connected to the first protocol signal input end 10, the second protocol signal output end 30, the data storage circuit 50 and the counter 80.

It should be noted that, in the present embodiment, upon receiving a high-level signal, which is transmitted by the counter and represents that the numerical value of the counter reaches a maximum value, the not-gate circuit performs a not operation to obtain a low-level signal, and outputs the low-level signal to the second protocol signal output end and the first and-gate circuit, such that the first and-gate circuit does not trigger the calculation of the counter due to the input of the low-level signal; and upon receiving a level signal, which is transmitted by the counter and represents that the numerical value of the counter is zero or does not reach the maximum value, the not-gate circuit performs a not operation to obtain a high-level signal, and outputs the high-level signal to the second protocol signal output end and the first and-gate circuit. Accordingly, when the first protocol signal input end transmits the high-level signal, the first and-gate circuit outputs the high-level signal to trigger the counter to count, such that the counter is flexibly controlled to perform numerical accumulation according to the currently stored data volume, the signal of the second protocol signal output end and the signal of the first protocol signal input end, thereby ensuring the counting accuracy of the counter, and thus further ensuring the overall reliability during the transmission process of the operation data.

Figure 6:
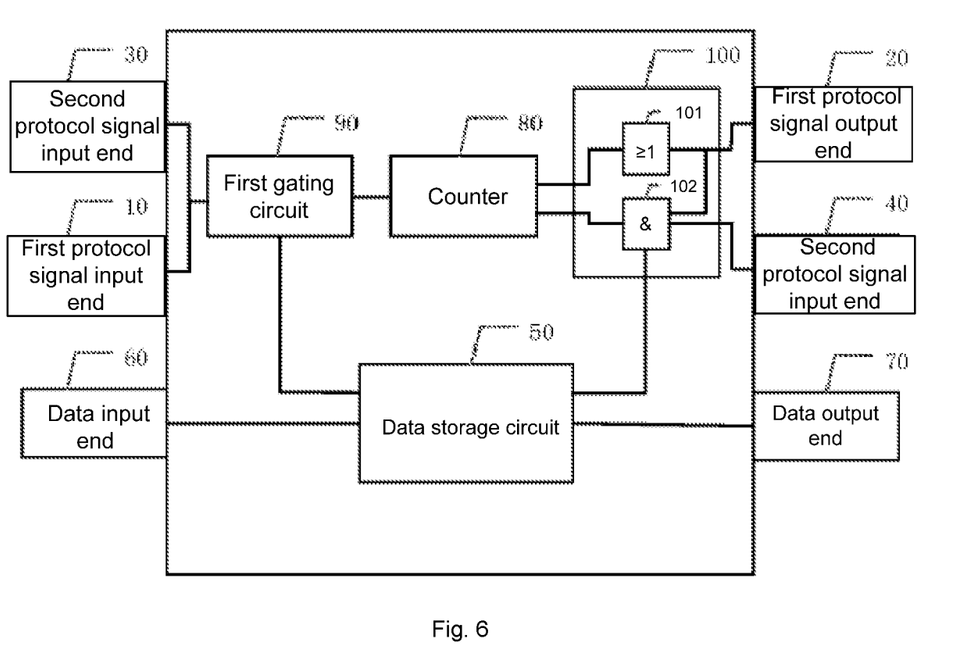
FIG. 6 is a schematic structural diagram of a handshake protocol circuit disclosed in an embodiment of this disclosure.

Please refer to FIG. 6, on the basis of the above embodiment, the second gating circuit 100 includes:

an or-gate circuit 101, respectively connected to the counter 80 and the first protocol signal output end 20; and a second and-gate circuit 102, respectively connected to the counter 80, the data storage circuit the first protocol signal output end 20 and the second protocol signal input end 40.

It should be noted that, in the present embodiment, when the or-gate circuit receives a high-level signal, which is transmitted by the counter and represents that a numerical value is recorded in the counter, the first protocol signal output end outputs the high-level signal, and when the second and-gate circuit simultaneously receives high levels, which are input by the second protocol signal input end and the or-gate circuit at the same time, the second and-gate circuit respectively outputs the high levels to the counter and the data storage circuit, so as to control the counter to reduce the count value, and to control the data storage circuit to output the operation data by the data output end. By means of the present embodiment, the counting accuracy of the counter is ensured, thereby further ensuring the overall reliability during the transmission process of the operation data.

On the basis of the foregoing series of embodiments, as a preferred embodiment, the counter is a count register.

It should be noted that, since the register has a smaller board area in the circuit board, when the counter is a count register, the board area of the entire handshake protocol circuit in the circuit board can be effectively reduced.

In addition, an embodiment of the present disclosure further provides a chip, including the handshake protocol circuit described above.

The chip provided in the present disclosure includes a handshake protocol circuit, which includes: a first protocol signal input end, configured to receive a first protocol signal transmitted by a first adjacent circuit; a first protocol signal output end, configured to output the first protocol signal to a second adjacent circuit; a second protocol signal output end, configured to output a second protocol signal to the first adjacent circuit; a second protocol signal input end, configured to receive the second protocol signal transmitted by the second adjacent circuit; a data input end, connected to a data storage circuit including a register, and configured to receive operation data transmitted by the first adjacent circuit; a data output end, connected to the data storage circuit, and configured to output the operation data to the second adjacent circuit; and a control circuit, respectively connected to the first protocol signal input end, the first protocol signal output end, the second protocol signal input end, the second protocol signal output end and the data storage circuit, and configured to: according to a level signal of the first protocol signal input end, control the second protocol signal output end to output a level signal and control the data storage circuit to store the operation data transmitted by the data input end, and according to a level signal of the second protocol signal input end, control the first protocol signal output end to output a level signal and control the data storage circuit to output the operation data to the data output end. By means of the present handshake protocol circuit in the present chip, according to the level signals of the first protocol signal input end, the first protocol signal output end, the second protocol signal input end and the second protocol signal output end, the control circuit controls the data storage circuit to store and output the operation data, which is equivalent to caching the operation data by of the storage circuit. Therefore, when the number of functional module circuits is relatively large, the continuity of combination logic of handshake protocols between the module circuits is relatively reduced, thereby relatively ensuring the normal communication of data between the functional module circuits.

In addition, an embodiment of the disclosure further provides a computer device, including the above chip.

The computer device provided in the present disclosure includes a handshake protocol circuit, which includes: a first protocol signal input end, configured to receive a first protocol signal transmitted by a first adjacent circuit; a first protocol signal output end, configured to output the first protocol signal to a second adjacent circuit; a second protocol signal output end, configured to output a second protocol signal to the first adjacent circuit; a second protocol signal input end, configured to receive the second protocol signal transmitted by the second adjacent circuit; a data input end, connected to a data storage circuit including a register, and configured to receive operation data transmitted by the first adjacent circuit; a data output end, connected to the data storage circuit, and configured to output the operation data to the second adjacent circuit; and a control circuit, respectively connected to the first protocol signal input end, the first protocol signal output end, the second protocol signal input end, the second protocol signal output end and the data storage circuit, and configured to: according to a level signal of the first protocol signal input end, control the second protocol signal output end to output a level signal and control the data storage circuit to store the operation data transmitted by the data input end, and according to a level signal of the second protocol signal input end, control the first protocol signal output end to output a level signal and control the data storage circuit to output the operation data to the data output end. By means of the present handshake protocol circuit in the present computer device, according to the level signals of the first protocol signal input end, the first protocol signal output end, the second protocol signal input end and the second protocol signal output end, the control circuit controls the data storage circuit to store and output the operation data, which is equivalent to caching the operation data by the storage circuit. Therefore, when the number of functional module circuits is relatively large, the continuity of combination logic of handshake protocols between the module circuits is relatively reduced, thereby relatively ensuring the normal communication of data between the functional module circuits.

The handshake protocol circuit, the chip and the computer device provided by the present disclosure have been described in detail above. Various embodiments in the specification are described in a progressive manner, each embodiment focuses on the difference from other embodiments, and the same or similar parts between the various embodiments refer to each other. For the apparatus disclosed in the embodiments, since the apparatus corresponds to the method disclosed in the embodiments, the description is relatively simple, and the relevant parts refer to the description of the method. It should be noted that, for those ordinary skilled in the art, several improvements and modifications may be made to the present disclosure without departing from the principles of the present disclosure, and these improvements and modifications also fall within the protection scope of the claims of the present disclosure.

It should also be noted that, in the present specification, relational terms such as first and second are merely used to distinguish one entity or operation from another entity or operation, and do not necessarily require or imply that any such actual relationship or order exists between these entities or operations. Moreover, the terms "include", "contain" or any other variants thereof are intended to cover non-exclusive inclusions, such that a process, a method, an article or a device including a series of elements not only includes those elements, but also includes other elements that are not explicitly listed, or also includes elements inherent to such a process, method, article or device. When there are no more restrictions, the element defined by the sentence "including a . . . " does not exclude the existence of other identical elements in the process, the method, the article or the device that includes the element.

What is claimed is:

1. A handshake protocol circuit, comprising:
   a first protocol signal input end, configured to receive a first protocol signal transmitted by a first adjacent circuit;
   a first protocol signal output end, configured to output the first protocol signal to a second adjacent circuit;
   a second protocol signal output end, configured to output a second protocol signal to the first adjacent circuit;
   a second protocol signal input end, configured to receive the second protocol signal transmitted by the second adjacent circuit;
   a data input end, connected to a data storage circuit comprising a register, and configured to receive operation data transmitted by the first adjacent circuit;
   a data output end, connected to the data storage circuit, and configured to output the operation data to the second adjacent circuit; and
   a control circuit, respectively connected to the first protocol signal input end, the first protocol signal output end, the second protocol signal input end, the second protocol signal output end and the data storage circuit, and configured to: control the second protocol signal output end to output a level signal and control the data storage circuit to store the operation data transmitted by the data input end according to a level signal of the first protocol signal input end, and control the first protocol signal output end to output a level signal and control the data storage circuit to output the operation data to the data output end according to a level signal of the second protocol signal input end.

2. The handshake protocol circuit as claimed in claim 1, wherein the control circuit comprises:
   a counter;
   a first gating circuit, respectively connected to the first protocol signal input end, the second protocol signal output end, the counter and the data storage circuit, and configured to: when a count value of the counter is zero, output a high-level signal to the second protocol signal output end, and when the second protocol signal output end and the first protocol signal output end are both high-level signals, control the counter to increase the count value, and control the data storage circuit to store, in the register, the operation data transmitted by the data input end; and
   a second gating circuit, respectively connected to the first protocol signal output end, the second protocol signal input end, the counter and the data storage circuit, and configured to: when the count value of the counter is not zero, output a high-level signal to the first protocol signal output end, and when both the first protocol signal output end and the second protocol signal input end output high-level signals, control the counter to decrease the count value, and control the data storage circuit to output the operation data in the register to the data output end.

3. The handshake protocol circuit as claimed in claim 2, wherein the data storage circuit comprises:
 a register group comprising a plurality of registers;
 a storage selection circuit, respectively connected to the data input end, the first gating circuit and the register group, and configured to: store the operation data transmitted by the data input end in a corresponding register in the register group according to a control signal transmitted by the first gating circuit; and
 an output selection circuit, respectively connected to the data output end, the second gating circuit and the register group, and configured to: output the operation data of the corresponding register in the register group by the data output end according to a control signal transmitted by the second gating circuit.

4. The handshake protocol circuit as claimed in claim 3, wherein the number of registers in the register group is 2.

5. The handshake protocol circuit as claimed in claim 3, wherein the handshake protocol circuit further comprises:
 a write pointer register, respectively connected to the storage selection circuit and the first gating circuit, and configured to record a first register serial number transmitted by the first gating circuit, such that the storage selection circuit stores the operation data in a corresponding register in the register group according to the first register serial number; and
 a read pointer register, respectively connected to the output selection circuit and the second gating circuit, and configured to record a second register serial number transmitted by the second gating circuit, such that the output selection circuit reads the operation data of the corresponding register in the register group according to the second register serial number.

6. The handshake protocol circuit as claimed in claim 2, wherein the first gating circuit comprises:
 a not-gate circuit, respectively connected to the second protocol signal output end and the counter; and
 a first and-gate circuit, respectively connected to the first protocol signal input end, the second protocol signal output end, the data storage circuit and the counter.

7. The handshake protocol circuit as claimed in claim 6, the not-gate circuit is configured to: when a high-level signal is received, perform a not operation to obtain a low-level signal, and output the low-level signal to the second protocol signal output end and the first and-gate circuit, such that the first and-gate circuit does not trigger a calculation of the counter due to the input of the low-level signal, wherein the high-level signal is transmitted by the counter and represents that a numerical value of the counter reaches a maximum value.

8. The handshake protocol circuit as claimed in claim 6, the not-gate circuit is configured to: when receiving a level high, which is transmitted by the counter and represents that a numerical value of the counter is zero or does not reach a maximum value, perform a not operation to obtain a high-level signal, and output the high-level signal to the second protocol signal output end and the first and-gate circuit.

9. The handshake protocol circuit as claimed in claim 2, wherein the second gating circuit comprises:
 an or-gate circuit, respectively connected to the counter and the first protocol signal output end; and
 a second and-gate circuit, respectively connected to the counter, the data storage circuit, the first protocol signal output end and the second protocol signal input end.

10. The handshake protocol circuit as claimed in claim 9, wherein the or-gate circuit is configured to: when a high-level signal is received, output the high-level signal by the first protocol signal output end, wherein the high-level signal is transmitted by the counter and represents that a numerical value is recorded in the counter.

11. The handshake protocol circuit as claimed in claim 9, wherein the second and-gate circuit is configured to: when high levels are received, respectively output the high levels to the counter and the data storage circuit, so as to control the counter to reduce the count value, and to control the data storage circuit to output the operation data by the data output end, wherein the high levels are input by the second protocol signal input end and the or-gate circuit at the same time.

12. The handshake protocol circuit as claimed in claim 2, a bit width of the counter is 2.

13. The handshake protocol circuit as claimed in claim 1, wherein the control circuit comprises a counter, the counter is a count register.

14. The handshake protocol circuit as claimed in claim 1, the first protocol signal comprises to a valid signal, and the second protocol signal comprises a ready signal.

15. A chip, comprising the handshake protocol circuit, wherein the handshake protocol circuit comprises:
 a first protocol signal input end, configured to receive a first protocol signal transmitted by a first adjacent circuit;
 a first protocol signal output end, configured to output the first protocol signal to a second adjacent circuit;
 a second protocol signal output end, configured to output a second protocol signal to the first adjacent circuit;
 a second protocol signal input end, configured to receive the second protocol signal transmitted by the second adjacent circuit;
 a data input end, connected to a data storage circuit comprising a register, and configured to receive operation data transmitted by the first adjacent circuit;
 a data output end, connected to the data storage circuit, and configured to output the operation data to the second adjacent circuit; and
 a control circuit, respectively connected to the first protocol signal input end, the first protocol signal output end, the second protocol signal input end, the second protocol signal output end and the data storage circuit, and configured to: control the second protocol signal output end to output a level signal and control the data storage circuit to store the operation data transmitted by the data input end according to a level signal of the first protocol signal input end, and control the first protocol signal output end to output a level signal and control the data storage circuit to output the operation data to the data output end according to a level signal of the second protocol signal input end.

16. The handshake protocol circuit as claimed in claim 15, wherein the control circuit comprises:
 a counter;
 a first gating circuit, respectively connected to the first protocol signal input end, the second protocol signal output end, the counter and the data storage circuit, and configured to: when a count value of the counter is zero, output a high-level signal to the second protocol signal output end, and when the second protocol signal output end and the first protocol signal output end are both high-level signals, control the counter to increase the count value, and control the data storage circuit to store, in the register, the operation data transmitted by the data input end; and a second gating circuit, respectively connected to the first protocol signal output end, the second protocol signal input end, the counter and the data storage circuit, and configured to: when the count value of the counter is not zero, output a high-level signal to the first protocol signal output end, and when both the first protocol signal output end and the second protocol signal input end output high-level signals, control the counter to decrease the count value, and control the data storage circuit to output the operation data in the register to the data output end.

17. The handshake protocol circuit as claimed in claim 16, wherein the data storage circuit comprises:

a register group comprising a plurality of registers;

a storage selection circuit, respectively connected to the data input end, the first gating circuit and the register group, and configured to: store the operation data transmitted by the data input end in a corresponding register in the register group according to a control signal transmitted by the first gating circuit; and an output selection circuit, respectively connected to the data output end, the second gating circuit and the register group, and configured to: output the operation data of the corresponding register in the register group by the data output end according to a control signal transmitted by the second gating circuit.

18. The handshake protocol circuit as claimed in claim 17, wherein the number of registers in the register group is 2.

19. The handshake protocol circuit as claimed in claim 17, wherein the handshake protocol circuit further comprises:

a write pointer register, respectively connected to the storage selection circuit and the first gating circuit, and configured to record a first register serial number transmitted by the first gating circuit, such that the storage selection circuit stores the operation data in a corresponding register in the register group according to the first register serial number; and a read pointer register, respectively connected to the output selection circuit and the second gating circuit, and configured to record a second register serial number transmitted by the second gating circuit, such that the output selection circuit reads the operation data of the corresponding register in the register group according to the second register serial number.

20. A computer device, comprising a chip, wherein the chip comprises the handshake protocol circuit, the handshake protocol circuit comprises:

a first protocol signal input end, configured to receive a first protocol signal transmitted by a first adjacent circuit;

a first protocol signal output end, configured to output the first protocol signal to a second adjacent circuit;

a second protocol signal output end, configured to output a second protocol signal to the first adjacent circuit;

a second protocol signal input end, configured to receive the second protocol signal transmitted by the second adjacent circuit;

a data input end, connected to a data storage circuit comprising a register, and configured to receive operation data transmitted by the first adjacent circuit;

a data output end, connected to the data storage circuit, and configured to output the operation data to the second adjacent circuit; and a control circuit, respectively connected to the first protocol signal input end, the first protocol signal output end, the second protocol signal input end, the second protocol signal output end and the data storage circuit, and configured to: control the second protocol signal output end to output a level signal and control the data storage circuit to store the operation data transmitted by the data input end according to a level signal of the first protocol signal input end, and control the first protocol signal output end to output a level signal and control the data storage circuit to output the operation data to the data output end according to a level signal of the second protocol signal input end.

* * * * *